United States Patent
Stremmel et al.

(10) Patent No.: US 12,272,168 B2
(45) Date of Patent: Apr. 8, 2025

(54) SYSTEMS AND METHODS FOR PROCESSING MACHINE LEARNING LANGUAGE MODEL CLASSIFICATION OUTPUTS VIA TEXT BLOCK MASKING

(71) Applicant: UnitedHealth Group Incorporated, Minnetonka, MN (US)

(72) Inventors: Joel Stremmel, Iowa City, IA (US); Eran Halperin, Santa Monica, CA (US); Brian Hill, Culver City, CA (US)

(73) Assignee: UNITEDHEALTH GROUP INCORPORATED, Minnetonka, MN (US)

( * ) Notice: Subject to any disclaimer, the term of this patent is extended or adjusted under 35 U.S.C. 154(b) by 345 days.

(21) Appl. No.: 18/046,831

(22) Filed: Oct. 14, 2022

(65) Prior Publication Data

US 2023/0334887 A1 Oct. 19, 2023

Related U.S. Application Data

(60) Provisional application No. 63/362,902, filed on Apr. 13, 2022.

(51) Int. Cl.
*G06V 30/414* (2022.01)
*G06F 40/284* (2020.01)
(Continued)

(52) U.S. Cl.
CPC .......... *G06V 30/414* (2022.01); *G06F 40/284* (2020.01); *G06V 30/19173* (2022.01); *G06V 30/413* (2022.01)

(58) Field of Classification Search
CPC ............... G06V 30/414; G06V 30/413; G06V 30/19173; G06F 40/284
(Continued)

(56) References Cited

U.S. PATENT DOCUMENTS

| | | |
|---|---|---|
| 9,147,041 B2 | 9/2015 | Amarasingham et al. |
| 10,395,772 B1 | 8/2019 | Lucas et al. |

(Continued)

FOREIGN PATENT DOCUMENTS

| | | |
|---|---|---|
| CN | 113535694 A | 10/2021 |
| CN | 112418409 B | 8/2023 |

(Continued)

OTHER PUBLICATIONS

Huang, et al., "PLM-ICD: Automatic ICD Coding with Pretrained Language Models", Jul. 12, 2022, (12 pages), arXiv:2207.05289v1.
(Continued)

*Primary Examiner* — Allen H Nguyen
(74) *Attorney, Agent, or Firm* — Alston & Bird LLP

(57) ABSTRACT

Various embodiments of the present disclosure provide methods, apparatus, systems, computing devices, computing entities, and/or the like for processing document classification system outputs, wherein classification routine iterations are performed using masked document data objects comprising one or more masked text blocks. Text block importance score for text blocks are generated and compared to generate predictive data output comprising text blocks determined to be the most influential in classifying the document data objects with respect to one or more classification labels.

20 Claims, 8 Drawing Sheets

(51) Int. Cl.
*G06V 30/19* (2022.01)
*G06V 30/413* (2022.01)

(58) Field of Classification Search
USPC .......................................................... 382/176
See application file for complete search history.

(56) References Cited

U.S. PATENT DOCUMENTS

| | | | |
|---|---|---|---|
| 11,087,088 B2 | 8/2021 | Chatterjee et al. | |
| 11,314,790 B2 | 4/2022 | Chang et al. | |
| 11,791,048 B2 | 10/2023 | Pang et al. | |
| 12,032,921 B2 | 7/2024 | Peleg et al. | |
| 2020/0097713 A1* | 3/2020 | Cramer | G06V 30/413 |
| 2020/0184016 A1 | 6/2020 | Roller | |
| 2020/0193153 A1* | 6/2020 | Lee | G06F 40/226 |
| 2020/0279105 A1 | 9/2020 | Muffat et al. | |
| 2020/0411147 A1 | 12/2020 | Kapit et al. | |
| 2021/0216762 A1 | 7/2021 | Brooks et al. | |
| 2021/0224306 A1 | 7/2021 | Choudhary et al. | |
| 2022/0005463 A1 | 1/2022 | Bender et al. | |
| 2022/0083898 A1* | 3/2022 | Shukla | G06F 40/284 |
| 2022/0114494 A1 | 4/2022 | Saleiro et al. | |
| 2022/0129791 A1 | 4/2022 | Nia et al. | |
| 2022/0351868 A1 | 11/2022 | Godbole et al. | |
| 2023/0222285 A1* | 7/2023 | Zhang | G06F 16/483 715/255 |
| 2024/0320422 A1 | 9/2024 | Peleg et al. | |

FOREIGN PATENT DOCUMENTS

| | | |
|---|---|---|
| EP | 3365800 A4 | 2/2019 |
| WO | 2024/042164 A2 | 2/2024 |

OTHER PUBLICATIONS

"Good Machine Learning Practice For Medical Device Development: Guiding Principles," U.S. Food & Drug Administration, Oct. 27, 2021, (2 pages), [Retrieved from the Internet Feb. 7, 2023] <URL: https://www.fda.gov/medical-devices/software-medical-device-samd/good-machine-learning-practice-medical-device-development-guiding-principles>.

"Integrated Gradients," Dec. 15, 2022, TensorFlow Core, (25 pages), (online), [Retrieved from the Internet Feb. 7, 2022] <URL: https://www.tensorflow.org/tutorials/interpretability/integrated_gradients>.

Ahmed, Nizar et al. "Classification Of Biomedical Texts For Cardiovascular Diseases With Deep Neural Network Using A Weighted Feature Representation Method," Healthcare, vol. 8, No. 4, pp. 1-15, Oct. 10, 2020, DOI: http://dx.doi.org/10.3390/healthcare8040392.

Arras, Leila et al. "Explaining Predictions of Non-Linear Classifiers In NLP," arXiv PrePrint arXiv: 1606.07298v1 [cs.CL] Jun. 23, 2016 (7 pages), DOI: https://arxiv.org/pdf/1606.07298.pdf.

Cai, Weihong et al. "Multi-Layer Contextual Passage Term Embedding For Ad-Hoc Retrieval," Information, vol. 13, No. 5, pp. 1-16, Apr. 25, 2022, DOI: http://dx.doi.org/10.3390/info13050221.

Dong, Qian et al. "Disentangled Graph Recurrent Network For Document Ranking," Data Science and Engineering, vol. 7, No. 1, pp. 30-43, Feb. 15, 2022, DOI: https://doi.org/10.1007/s41019-022-00179-3.

Ji, Shaoxiong et al. "Does The Magic Of BERT Apply To Medical Code Assignment? A Quantitative Study," Computers In Biology and Medicine, vol. 139:104998, Oct. 26, 2021, pp. 1-7, available online: https://doi.org/10.1016/j.compbiomed.2021.104998.

Jin, Xisen et al. "Towards Hierarchical Importance Attribution: Explaining Compositional Semantics for Neural Sequence Models," arXiv PrePrint arXiv:1911.06194v1 [cs.CL] Nov. 8, 2019, (12 pages), available online at https://arxiv.org/pdf/1911.06194v1.pdf.

Kokalj, Enja et al. "BERT Meets Shapley: Extending SHAP Explanations To Transformer-Based Classifiers," In Proceedings of The EACL Hackashop On News Media Content Analysis and Automated Report Generation, Apr. 2021, pp. 16-21, available online at https://aclanthology.org/2021.hackashop-1.3.pdf.

Lundberg, Scott. "SHAP: A Game Theoretic Approach To Explain The Output Of Any Machine Learning Model," Github, Jun. 15, 2022, (8 pages), [Retrieved from the Internet Feb. 7, 2023] <URL: https://github.com/slundberg/shap>.

Mahbub, Maria et al. "Unstructured Clinical Notes Within The 24 Hours Since Admission Predict Short, Mid & Long-Term Mortality In Adult ICU Patients," PLoS One, vol. 17, No. 1:e0262182, pp. 1-23, Jan. 6, 2022, DOI: https://doi.org/10.1371/journal.pone.0262182.

Mehta, Vivek et al. "WEClustering: Word Embeddings Based Text Clustering Technique For Large Datasets," Complex & Intelligent Systems, vol. 7, pp. 3211-3224, DOI: https://doi.org/10.1007/s40747-021-00512-9.

Pierse, Charles. "Transformers Interpret," Oct. 17, 2022, (3 pages), (online), [Retrieved from the Internet Feb. 7, 2023] <URL: https://github.com/cdpierse/transformers-interpret#sequence-classification-explainer>.

Skrlj, Blaz, et al. "Exploring Neural Language Models via Analysis of Local and Global Self-Attention Spaces," In Proceedings of the EACL Hackashop On News Media Content Analysis and Automated Report Generation, Apr. 19, 2021, pp. 76-83, available online at https://aclanthology.org/2021.hackashop-1.11.pdf.

Sun, Xu et al. "Feature-Frequency-Adaptive On-Line Training For Fast and Accurate Natural Language Processing," Computational Linguistics, vol. 40, No. 3, pp. 563-586, Sep. 1, 2014, DOI: 10.1162/COLL_a_00193.

Sundararajan, Mukund et al. "Axiomatic Attribution For Deep Networks," In Proceedings of the 34th International Conference On Machine Learning, PMLR, vol. 70, pp. 3319-3328, (Year: 2017). PMLR. https://arxiv.org/pdf/1703.01365.

Yin, Kayo et al. "Interpreting Language Models With Contrastive Explanations," arXiv preprint arXiv:2202.10419. https://arxiv.org/pdf/2202.10419v1 [cs.CL] Feb. 21, 2022, (13 pages), available online at https://arxiv.org/pdf/2202.10419v1.pdf.

Zhang, Sheng et al. "Locally Aggregated Feature Attribution On Natural Language Model Understanding," arXiv PrePrint arXiv:2204.10893v2 [cs.CL] Apr. 26, 2022, (13 pages), DOI: https://arxiv.org/pdf/2204.10893.pdf.

Chalkidis, et al., "An Exploration of Hierarchical Attention Transformers for Efficient Long Document Classification", available online at https://arxiv.org/pdf/2210.05529, Oct. 11, 2022, (16 pages).

Kim, et al., "Feature Attribution Analysis to Quantify the Impact of Oceanographic and Maneuverability Factors on Vessel Shaft Power Using Explainable Tree-Based Model", Sensors, vol. 23, Jan. 17, 2023, (21 pages), DOI:10.3390/s23031072.

Rasmy, et al., "Med-BERT: Pretrained Contextualized Embeddings on Largescale Structured Electronic Health Records for Disease Prediction", Digital Medicine vol. 4, No. 86, May 20, 2021, (13 pages), DOI:10.1038/s41746-021-00455-y.

Sood, et al., "Feature Importance Explanations for Temporal Black-Box Models", available online at https://arxiv.org/pdf/2102.11934.pdf, Feb. 23, 2021, (13 pages).

* cited by examiner

```
┌─────────────────────────────────────────────────────────┐
│ Identify, for a selected classification label, each     │     ↗ 405
│ per-iteration masked probability score associated       │
│ with the text block                                     │
│ 601                                                     │
└─────────────────────────────────────────────────────────┘
                           ↓
┌─────────────────────────────────────────────────────────┐
│ Generate, a per-label masked label probability score    │
│ associated with the text block                          │
│ 602                                                     │
└─────────────────────────────────────────────────────────┘
                           ↓
┌─────────────────────────────────────────────────────────┐
│ Generate the per-label text block importance score for  │
│ the text block                                          │
│ 603                                                     │
└─────────────────────────────────────────────────────────┘
```

FIG. 6

| Diagnosis | Text Block | $\Delta P(code)$ | p-value |
|---|---|---|---|
| pneumonia, organism unspecified | pneumonia patient being discharged o n maximal copd regimen including | 0.407 | < 0.001 |
| subendocardial infarction, initial episode of care | lovenox bridge nstemi o n admission the patient had elevated | 0.420 | < 0.001 |
| atrial fibrillation | consulted amiodarone was held rhythm slowly began to recover she | 0.186 | < 0.001 |
| aortocoronary bypass status | al likely improve as pna improves s p cabg complicated | 0.207 | < 0.001 |
| acute respiratory failure | albuterol and ipra prn his acidosis slowly improved as did | 0.282 | < 0.001 |

700 — 702 Diagnosis — 704 Text Block — 706 $\Delta P(code)$ — 708 p-value

FIG. 7

For a pair of text blocks, identify each per-iteration masked label probability score associated with the pair of text blocks
801

Generate, per-label pairwise masked label probability score associated with the pair of text blocks
802

Generate a per-label pairwise text block importance score
803

SYSTEMS AND METHODS FOR PROCESSING MACHINE LEARNING LANGUAGE MODEL CLASSIFICATION OUTPUTS VIA TEXT BLOCK MASKING

CROSS-REFERENCES TO RELATED APPLICATIONS

The present application claims priority to U.S. Provisional Patent Application No. 63/362,902, filed Apr. 13, 2022, which is incorporated herein by reference in its entirety.

BACKGROUND

Various embodiments of the present disclosure address technical challenges related to performing document classification and provide solutions to address the efficiency and reliability shortcomings of existing machine learning language model classification systems.

BRIEF SUMMARY

In general, various embodiments of the present disclosure provide methods, apparatus, systems, computing devices, computing entities, and/or the like for processing document classification system outputs.

In accordance with one aspect, a method is provided. In one embodiment, the method comprises: generating, using one or more processors, an unmasked label probability score for each of one or more classification labels based at least in part on one or more document data objects; for each of the one or more documents data objects: segmenting, using the one or more processors, the document data object into a plurality of text blocks; performing, using the one or more processors and the document classification machine learning model, a classification of the document data object via one or more classification routine iterations, wherein each classification routine iteration is configured to: (i) mask one or more of the plurality of text blocks (ii) generate, using the document classification machine learning model, per-masked document classification of the document data object, based at least in part on the masking of the one or more of the plurality of text blocks, and (iii) generate one or more per-iteration masked label probability scores based at least in part on the masked one or more of the plurality of text blocks absent from the document data object, wherein each of the one or more per-iteration masked label probability scores correspond to a particular classification label of the one or more classification labels and is associated with each text block of the masked one or more of the plurality of text blocks; for each text block of the masked one or more of the plurality of text blocks: generating, using the one or more processors, one or more per-label text block importance scores based at least in part on the corresponding unmasked label probability score and each per-iteration masked label probability scores associated with the text block; generating, using the one or more processors, a predictive data output for the document data object based at least in part on the one or more per-label text block importance scores; and performing, using the one or more processors, one or more prediction-based actions based at least in part on the predictive data output for the one or more document data objects.

In accordance with another aspect, an apparatus comprising at least one processor and at least one memory including computer program code is provided. In one embodiment, the at least one memory and the computer program code may be configured to, with the processor, cause the apparatus to: generate an unmasked label probability score for each of one or more classification labels based at least in part on one or more document data objects; for each of the one or more documents data objects: segment the document data object into a plurality of text blocks; perform, using the one or more processors and the document classification machine learning model, a classification of the document data object via one or more classification routine iterations, wherein each classification routine iteration is configured to: (i) mask one or more of the plurality of text blocks (ii) generate, using the document classification machine learning model, per-masked document classification of the document data object, based at least in part on the masking of the one or more of the plurality of text blocks, and (iii) generate one or more per-iteration masked label probability scores based at least in part on the masked one or more of the plurality of text blocks absent from the document data object, wherein each of the one or more per-iteration masked label probability scores correspond to a particular classification label of the one or more classification labels and is associated with each text block of the masked one or more of the plurality of text blocks; —for each text block of the masked one or more of the plurality of text blocks: —generate one or more per-label text block importance scores based at least in part on the corresponding unmasked label probability score and each per-iteration masked label probability scores associated with the text block; —generate a predictive data output for the document data object based at least in part on the one or more per-label text block importance scores; and perform one or more prediction-based actions based at least in part on the predictive data output for the one or more document data objects.

In accordance with yet another aspect, a computer program product is provided. The computer program product may comprise at least one computer-readable storage medium having computer-readable program code portions stored therein, the computer-readable program code portions comprising executable portions configured to: generate an unmasked label probability score for each of one or more classification labels based at least in part on one or more document data objects; for each of the one or more documents data objects: segment the document data object into a plurality of text blocks; perform, using the one or more processors and the document classification machine learning model, a classification of the document data object via one or more classification routine iterations, wherein each classification routine iteration is configured to: (i) mask one or more of the plurality of text blocks (ii) generate, using the document classification machine learning model, per-masked document classification of the document data object, based at least in part on the masking of the one or more of the plurality of text blocks, and (iii) generate one or more per-iteration masked label probability scores based at least in part on the masked one or more of the plurality of text blocks absent from the document data object, wherein each of the one or more per-iteration masked label probability scores correspond to a particular classification label of the one or more classification labels and is associated with each text block of the masked one or more of the plurality of text blocks; —for each text block of the masked one or more of the plurality of text blocks: —generate one or more per-label text block importance scores based at least in part on the corresponding unmasked label probability score and each per-iteration masked label probability scores associated with the text block; —generate a predictive data output for the document data object based at least in part on the one or more per-label text block importance scores; and perform one or more prediction-based actions based at least in part on the predictive data output for the one or more document data objects.

BRIEF DESCRIPTION OF THE DRAWINGS

Figure 1:
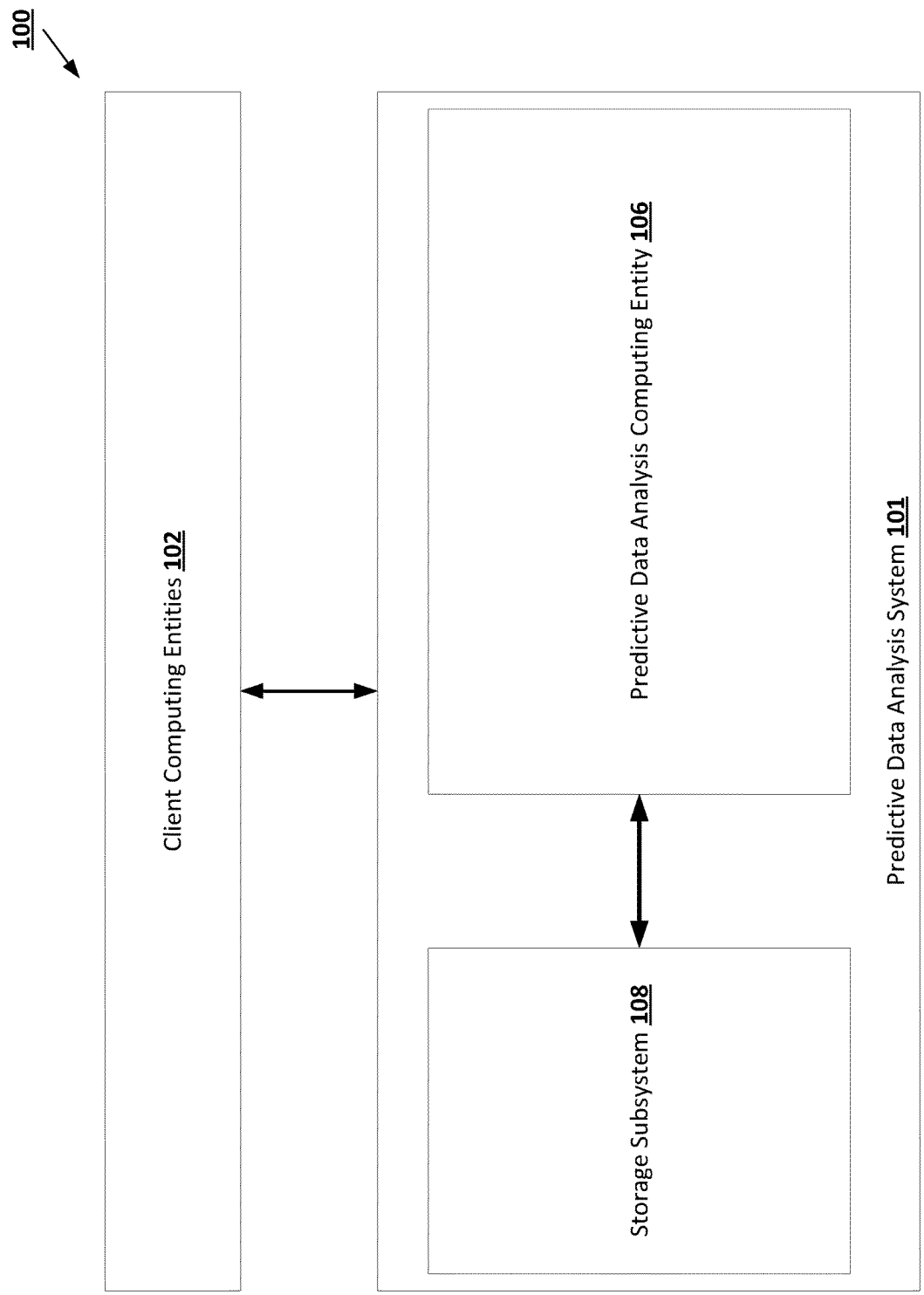

Having thus described the disclosure in general terms, reference will now be made to the accompanying drawings, which are not necessarily drawn to scale, and wherein:

FIG. 1 provides an exemplary overview of an architecture that can be used to practice embodiments of the present disclosure.

Figure 2:
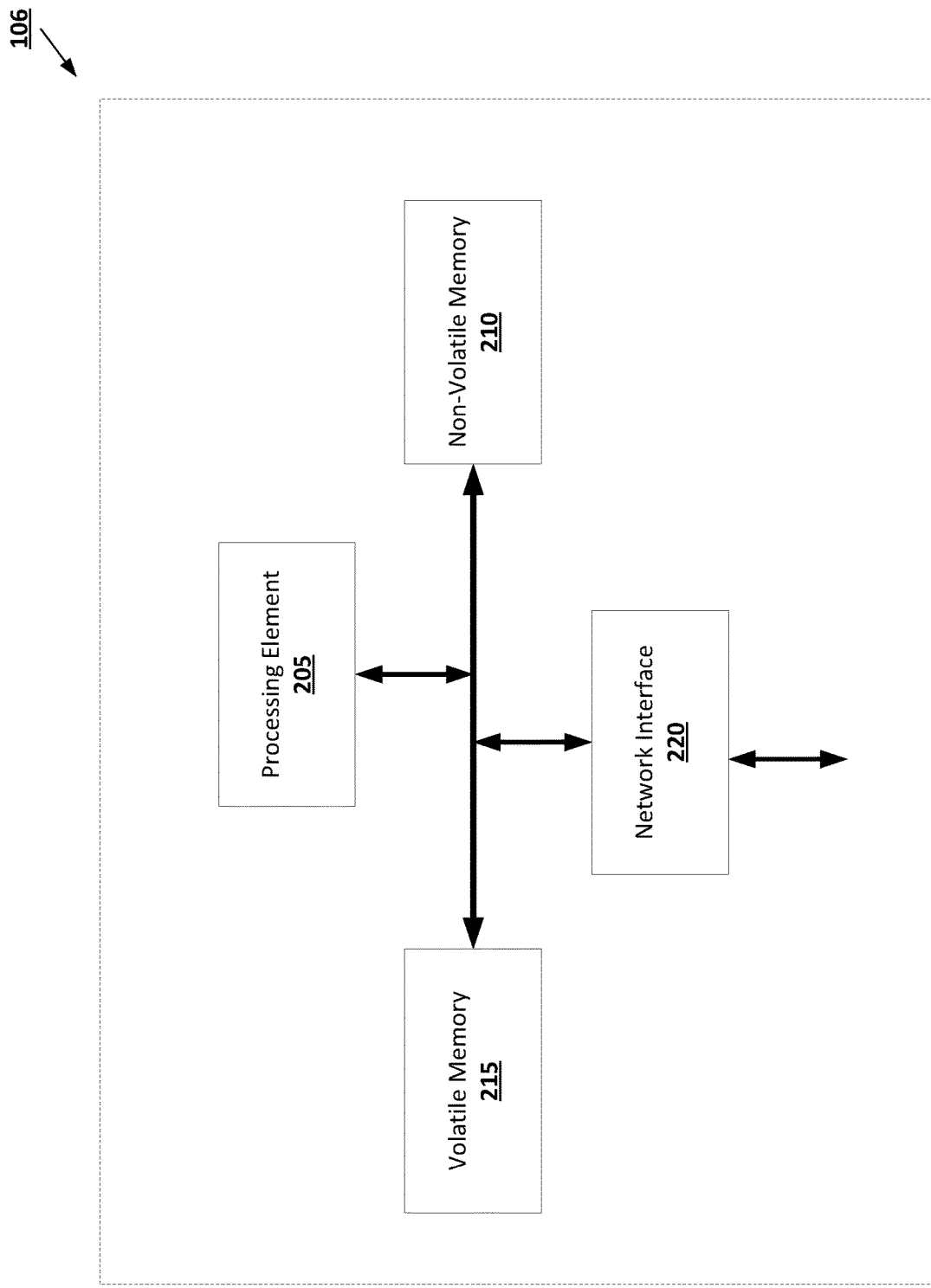

FIG. 2 provides an example predictive data analysis computing entity in accordance with some embodiments discussed herein.

Figure 3:
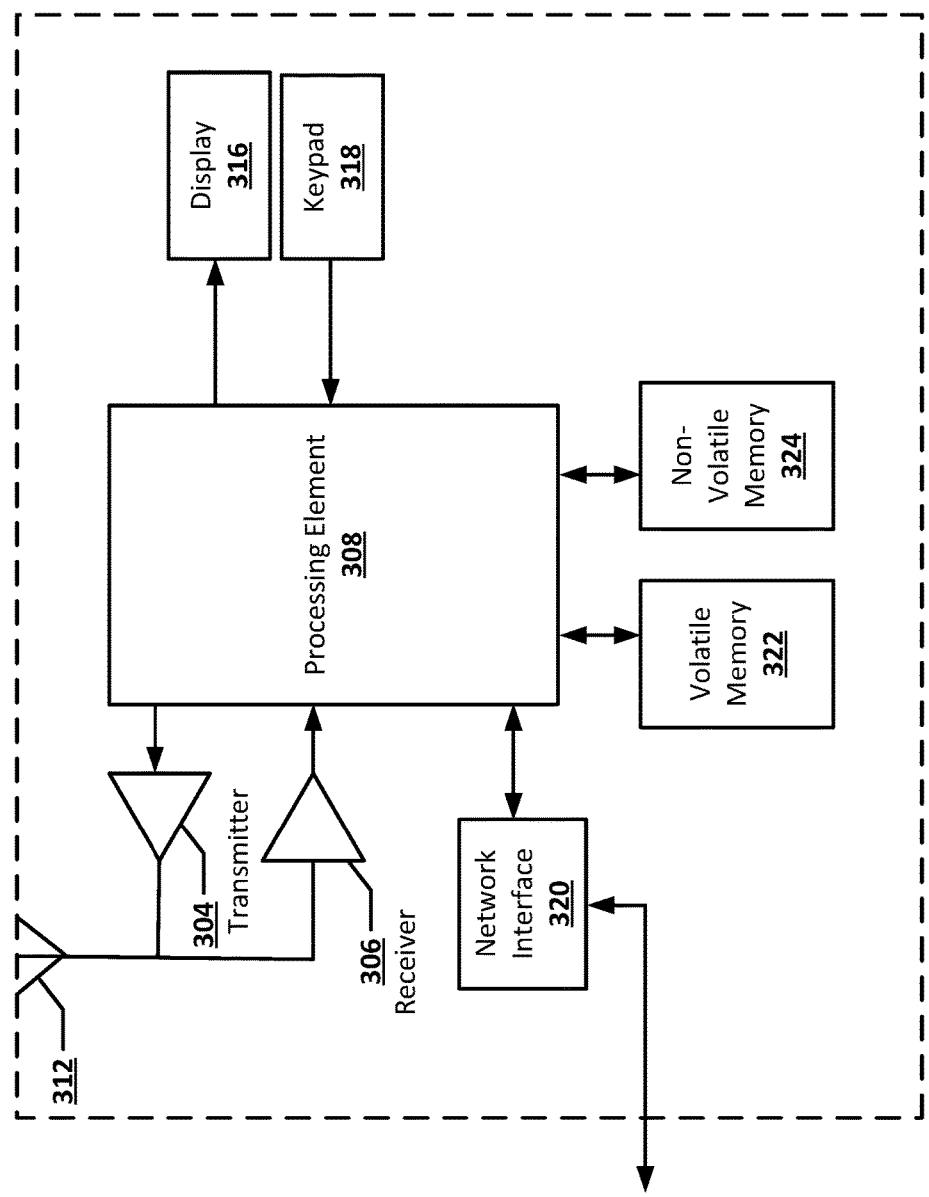

FIG. 3 provides an example client computing entity in accordance with some embodiments discussed herein.

Figure 4:
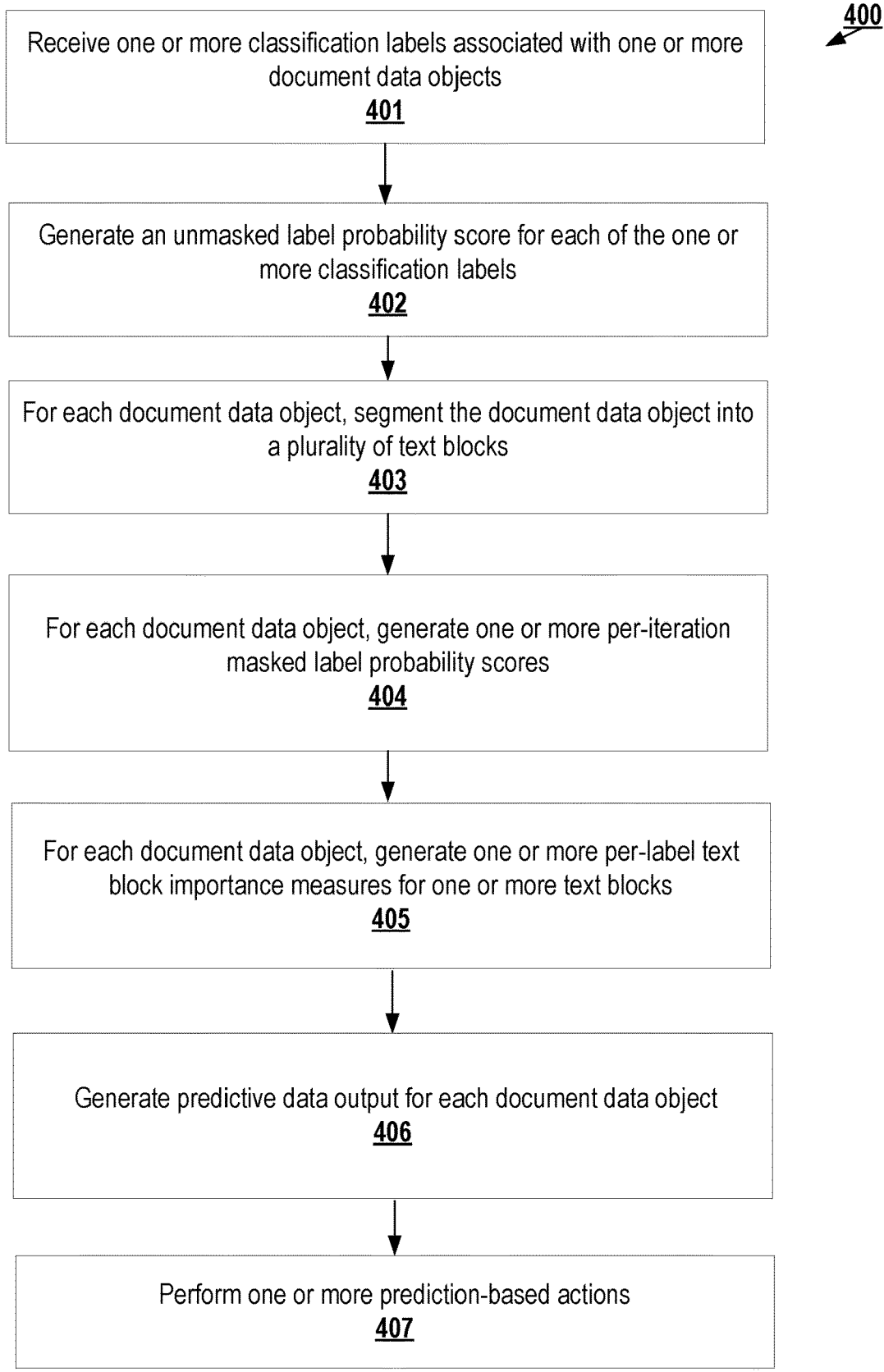

FIG. 4 is a flowchart diagram of an example process for processing document classification system outputs in accordance with some embodiments discussed herein.

Figure 5:
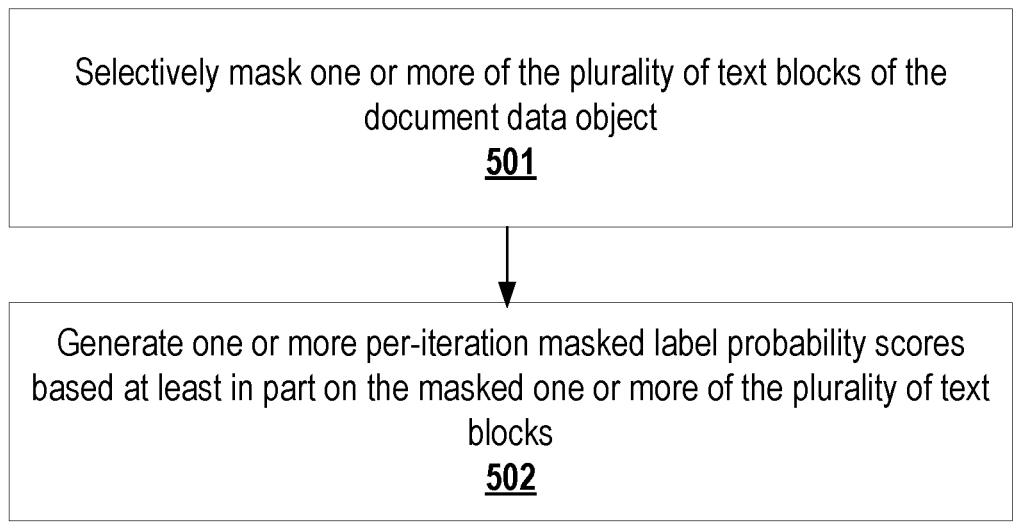

FIG. 5 is a flowchart diagram of an example process for performing classification routine iteration in accordance with some embodiments discussed herein.

FIG. 6 is a flowchart diagram of an example process for generating per-label text block importance score in accordance with some embodiments discussed herein.

FIG. 7 provides an operational example of predictive data output in accordance with some embodiments discussed herein.

FIG. 8 is a flowchart diagram of an example process for generating a per-label pairwise text block importance score in accordance with some embodiments discussed herein.

DETAILED DESCRIPTION

Various embodiments of the present disclosure now will be described more fully hereinafter with reference to the accompanying drawings, in which some, but not all, embodiments of the disclosures are shown. Indeed, these disclosures may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present disclosure are described with reference to predictive data analysis, one of ordinary skill in the art will recognize that the disclosed concepts can be used to perform other types of data analysis.

I. OVERVIEW AND TECHNICAL IMPROVEMENTS

Various embodiments of the present disclosure make important technical contributions to improving predictive accuracy, computational efficiency, and speed of machine learning language models by assessing the influence of blocks of text on the probability of a document being assigned a given classification label, which in turn improves training speed and training efficiency of training predictive machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency-Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training predictive machine learning models.

For example, various embodiments of the present disclosure improve document classification using machine learning by analyzing multiple text blocks of a document of size K and assigning a probability for each evaluation. As an example, language machine learning models that use sparse attention mechanisms generally do not compare every token to every token during training, and because not every token attends to every other token, natively within the language machine learning model, there are not weights for every pair of tokens to represent how important a given pair of token is to classification. Various embodiments of the present disclosure approximates self-attention by analyzing groups of tokens, which are generally more informative than individual tokens. As described herein, existing natural language processing techniques focus on individual words or tokens, and are prohibitively expensive in terms of runtime and are not well-suited for long documents, as runtime grows quadratically with the length of the document for these existing techniques. Additionally, existing methods do not provide measures of statistical significance and fail to surface informative explanations of predictions on documents.

However, in accordance with various embodiments of the present disclosure, a predictive data analysis computing entity may be configured to generate predictive data output that includes blocks of text (text blocks) determined to be most influential on the probability of a document being assigned a given classification label by masking many text blocks of size K tokens at once with probability P. Additionally, in accordance with various embodiments of the present disclosure the expected number of times a given text block is masked (e.g., expected text block masking count J) and the impact of each text block on each classification label prediction from performing a required number of classification routine iterations N (where N=J/P) enables the number of evaluations and/or operations required by various embodiments of the present disclosure to be independent of document length. In doing so, the techniques described herein improve efficiency and speed of predictive systems for predictive systems machine learning models, thus reducing the number of computational operations needed and/or the amount of training data entries needed to train predictive machine learning models. Accordingly, the techniques described herein improve at least one of the computational efficiency, storage-wise efficiency, and speed of training predictive machine learning models.

II. DEFINITIONS

The term "document data object" may refer to a data construct that describes a collection of one or more words. Examples of document data objects include medical notes, clinical notes, medical charts, discharge summaries, and/or other collection of text data. A document data object may comprise an unlabeled document data object, where an objective of a machine learning model, such as a document classification machine learning model, may be to perform one or more prediction inference operations to assign one or more classification labels to the unlabeled document data object. For example, a machine learning model may be configured to assign one or more International Statistical Classification of Diseases (ICD) codes, Current Procedural Terminology (CPT) codes, prescription (RX) codes, and/or the like to clinical notes, medical, charts, discharge summaries, and/or the like.

The term "classifier" may refer to a data construct that describes hyperparameters, and/or defined operations of a machine learning model configured to perform classification on, for example, document data objects. In one embodiment, the machine learning model may comprise a document classification machine learning model, where the machine learning model is trained with training input data objects (e.g., training document data objects) including classification labels, and the machine learning model is configured to process a document data object to generate a predictive inference that describes a selected classification label for the document data object. For example, a classifier may generate a predictive inference associated with a particular ICD code (corresponding to a particular condition) based at least in part on medical visit data record (e.g., clinical notes, medical notes, medical chart discharges summaries, and/or the like).

The term "classification" may refer to a data construct that describes the process of performing one or more predictive inference operations with respect to a document data object, using one or more classification labels, to generate a classification output for the document data object.

The term "document classification machine learning model" may refer to a data construct that describes parameters, hyperparameters, and/or defined operations of a machine learning model that is configured to process a document data object to generate a classification with respect to one or more classification labels. The document classification machine learning model may be any text-based machine learning model that is configured to perform one or more prediction inference operations with respect to a document data object to generate a prediction based at least in part on the document. In some embodiments, performing one or more prediction inference operations may comprise analyzing and/or processing the document data object. Examples of document classification machine learning models may include long document models, Bidirectional Encoder Representation from Transformers (BERT), Big Bird, and/or the like. In an example, a document classification machine learning model may be configured to process medical data records associated with members of a health care plan and identify medical conditions and/or identify potential undocumented conditions to a medical decision aid system. For example, in some embodiments, a document classification machine learning model may be configured to assign one or more diagnosis codes (e.g., International Classification of Diseases Codes (ICD) and/or other medical codes) to a particular medical document data object (e.g., clinical notes, medical, charts, discharge summaries, and/or the like).

The term "multi-label classification machine learning model" may refer to a data construct that describes parameters, hyperparameters, and/or defined operations of a machine learning model that is configured to process a document data object, to generate a multi-label classification for the document data object. In an example, the multi-label classification machine learning model may comprise a sequence of classifiers configured to process the document data object to generate a predictive inference. Each of the classifiers may be associated with a respective classification label from a given classification label group that may, for example, comprise non-exclusive classification labels. In an example, a multi-label classification machine learning model may be configured to generate a classification for each classification label of a classification label group associated with a document data object. For example, given a classification label group comprising m classification labels, a multi-label classification machine learning model may be configured to generate a classification for each classification label of the m classification labels based at least in part on processing the document data object with respect to the m classification labels. For example, m classifiers of a multi-label classification machine learning model may process the document data object with respect to the particular classification label associated with the respective classifier to generate a classification (e.g., one or more classification labels) for the particular classification label based at least in part on the content (e.g., text) of the document data object.

The term "text block" may refer to a data construct that describes a sequence of words within a document data object, where the sequence of words may be represented as a sequence of tokens (e.g. word token and/or subword tokens).

The term "label probability score" may refer to a data construct that describes a likelihood of a given classification label being descriptive or representative of a document data object (e.g., clinical note). For example, the label probability score for a classification label with respect to a document data object may describe a predictive score indicative of whether or not the classification label should be assigned to the document data object. In some embodiments, a label probability score may comprise the label probability of a positive classification label.

The term "unmasked document data object" may describe a document data object comprising the full text occurring with the document data object (e.g., comprising each word/subword occurring within the document data object).

The term "masked document data object" may describe a document data object comprising one or more masked text blocks. In various embodiments, a masked document data may comprise a version of document data object used in analyzing the influence of text blocks in the document data object in classifying the document data object according to one or more classification labels. In various embodiments, a predictive system may perform a required number of classification routine iterations using masked document data objects.

The term "unmasked label probability score" may refer to a data construct that describes a label probability score for a particular classification label that is generated based at least in part on an unmasked document data object. An unmasked label probability score may comprise a likelihood of a given classification label being descriptive or representative of a document data object. For example, the unmasked label probability score for a particular classification label generated based at least part on a particular unmasked document data object may describe a predictive score indicative of whether or not the particular classification label should be assigned to the particular document data object. In some embodiments, an unmasked label probability score may comprise the probability of a positive classification label. In some embodiments, for a given classification label, the importance (e.g., influence) of a text block in classifying a document data object according to the classification label may be generated based at least in part on comparing the unmasked label probability score associated with text block with a masked label probability score (e.g., per-masked label probability score) associated with the text block.

The term "per-label masked label probability score" may refer to a data construct that describes a label probability score for a document data object generated by a predictive system based at least in part on performing a classification routine iteration using a masked version of the document data objects (e.g., masked document data object), where the generated label probability score may be used to determine the importance (e.g., influence) of a text block in classifying the document data object according to the corresponding classification label. In various embodiments, a per-label masked label probability score may be generated by a predictive system based at least in part on one or more per-iteration masked label probability scores associated with the text block.

The term "predictive data output" may refer to a data construct that describes a prediction result generated by a predictive system. The predictive data output may comprise data representative of explanation of the prediction of a machine learning model, such as a language machine learning model. In various embodiments, the predictive data output may comprise one or more text blocks of a document data object determined as being most influential in classifying the document data object with respect to one or more classification labels. In various embodiments, the one or more text blocks may be ranked according to their predicted influence on classifying the document data object, which may be determined based at least in part on text block importance measures for the plurality of text blocks within the document data object.

The "term classification routine iterations" may refer to a data construct that describes repetition of classification operations performed using a plurality of masked document data objects. In various embodiments, classification routine iterations may comprise a process of obtaining successively closer approximations to the solution of a problem, such as identifying text blocks that contribute to a given classification label prediction by a machine learning model, such as a document classification machine learning model. In some embodiments, each classification routine iteration is configured: (i) mask one or more of the plurality of text blocks of the document data object, such that each text block of the masked one or more text blocks is absent from the document data object, (ii) generate, using a document classification machine learning model, per-masked classification of the document data object based at least in part on the masking of the one or more of the plurality of text blocks, and (iii) generate one or more per-iteration masked label probability scores for the classification based at least in part on the masked one or more of the plurality of text blocks absent from the document data object.

The term "required number of classification routine iterations" may refer to a data construct that describes the number classification routine iterations that should be performed by a predictive system such that each text block is masked at least a defined minimum number of classification routine iterations (e.g., expected text block masking count) to achieve optimal result. In some embodiments, the required number of classification routine iterations may be determined based at least in part on expected text block masking count and text block masking probability.

The term "expected text block masking count" may refer to a data construct that describes a defined minimum number of classification routine iterations that should be performed by a predictive system in which a given text block should be masked to achieve optimal result.

The term "text block masking probability" may refer to a data construct that describes the probability/likelihood that a given text block will be masked during a given classification routine iteration performed by a predictive system.

The term "predictive system" may refer to a computing system or apparatus comprising at least one processor and at least one memory including program code, wherein the at least one memory and the program code are configured to, with the processor, cause the computing system or apparatus to at least generate predictive output data for given classifications of document data objects. Generating predictive output data by the predictive system may comprise for example, segmenting a document data object into a plurality of text blocks, generating a text block importance score for one or more of the text blocks (e.g., all text blocks) based at least in part on performing one or more classification routine operations with respect to a document classification machine learning model, and generating text block importance measures (e.g., per-label text block importance scores, non-label-specific text block importance scores) of the classification predictions of the document classification machine learning model based at least in part on the text block importance scores.

The term "token" may refer to a data construct that describes a representation of a word or subword of a document data object.

The term "natural language processing output" may refer to a data construct that describes an inferred text classification.

The term "per-iteration masked label probability scores" may refer to a data construct that describes a label probability score for a document data object with one or more text blocks of the document data object masked (e.g., omitted). In various embodiments, a per-iteration masked label probability score may comprise an output of a classification routine iteration performed by a predictive system using a masked document data object. In various embodiments, the predictive system may generate per-iteration label probability scores to determine the contribution of a text block and/or combination of text blocks to the unmasked label probability score of a document data object.

The term "per-label text block importance score" may refer to a data construct that describes a measure indicative of the importance (e.g., influence) of a given text block in classifying a document data object according to a particular classification label. In one embodiment, a per-label text block importance score for a given text block of document data object may be indicative of the importance of the given text block in classifying the document data object based at least in part on the contribution of the text block to the classification probability of a particular classification label. In other words, a per-label text block importance score for a given text block of a document data object may be indicative of the influence of the text block on the probability of the document data object being assigned a given classification label. For example, given a machine learning model configured to classify a long medical document (e.g., clinical note, medical chart, and/or the like) with respect to one or more diagnosis code labels, a predictive system may segment the long medical document into text blocks, and for a given diagnosis code label (e.g., ICD code label), generate a per-label text block importance score for each text block, where each per-label text block importance score may be indicative of the importance of the text block in classifying the medical document according to the given diagnosis code label (e.g., assigning the diagnosis code label to the medical document).

The term "masking" may refer to a data construct that describes the process of omitting, filtering, or removing text (e.g., text blocks) from a document data object. In various embodiments, to determine the influence of a given text block on the probability of a document data object being assigned to a given classification label, a required number of classification routine iterations may be performed with respect to the document data object, where for each classification routine iteration, one or more text blocks are omitted, removed, or filtered from the document data object, and a per-iteration masked label probability is generated based at least in part on the omitted, removed, or filtered text blocks.

The term "non-label-specific text block importance score" may refer to a data construct that describes a measure that is indicative of the importance (e.g., influence) of a given text block in classifying a document data object according to two or more classification labels (e.g., non-exclusive classification labels). In one embodiment, a non-label-specific text block importance score for a given text block of document data object may be indicative of the importance of the given text block in classifying the document data object based at least in part on the contribution of the text block to the classification probability of two or more classification labels. In other words, a non-label-specific text block importance score for a given text block of a document data object may be indicative of the influence of the text block on the probability of the document data object being assigned each of the two or more classification labels. For example, given a machine learning model configured to classify a long medical document (e.g., clinical note, medical chart, and/or the like) with respect to a plurality of diagnosis code labels, a predictive system may segment the long medical document into text blocks, and for a given two or more diagnosis code label (e.g., ICD code labels), generate a non-label-specific text block importance score for one or more text blocks, where each non-label-specific text block importance score may be indicative of the importance of the text block in classifying the medical document according to the two or more diagnosis code labels (e.g., assigning the two or more diagnosis code labels to the medical document). In some embodiments, a non-label-specific text block importance score for a given text block with respect to two or more classification labels may be determined by averaging the per-label text block importance score for the two or more classification labels.

The term "per-masked document classification" may refer to a data construct that describes a classification output for a document data object that is generated based at least in part on performing a classification using a masked document data object corresponding to the document data object (e.g., a copy/version of the document data object having one or more masked/omitted text blocks).

The term "per-label pairwise text block importance score" may refer to a data construct that describes the relative importance for a given pair of text blocks of the plurality of text blocks of a document data object with respect to a particular classification label. A per-label pairwise text block importance score may be indicative of which text blocks occurring as distant parts within the document data object combine to influence the classification label probability for the document data object with respect to a particular classification label.

III. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions. An example of a prediction-based action that can be performed using the predictive data analysis system 101 is a generating prediction output user interface displaying the predictive data output generated by the predictive data analysis system.

For example, various embodiments of the present disclosure improve predictive systems including predictive machine learning models by masking multiple text blocks of a document of size K with probability P for each evaluation such that the number of evaluations required is independent of a document length. As described herein, existing natural language processing techniques focus on individual words or tokens, are prohibitively expensive in terms of runtime and are not well-suited for long documents, as runtime grows quadratically with the length of the document for these existing techniques. Additionally, existing methods do not provide measures of statistical significance and fail to surface clinically informative explanations of predictions from, for example, medical documents.

In accordance with various embodiments of the present disclosure, a predictive data analysis computing entity may be configured to generate a predictive data output that includes blocks of text (text blocks) determined to be most influential on the probability of a document being assigned a given classification label by masking many text blocks of size K tokens at once with probability P. Additionally, in accordance with various embodiments of the present disclosure the expected number of times a given text block is masked and the impact of each text block on each label prediction from performing a required number of classification routine iterations N (where N=J/P) enables the number of evaluations and/or operations required by various embodiments of the present disclosure to be independent of document length. In doing so, the techniques described herein improve efficiency and speed of predictive systems for predictive systems machine learning models, thus reducing the number of computational operations needed and/or the amount of training data entries needed to train predictive machine learning models. Accordingly, the techniques described herein improve at least one of the computational efficiency, storage-wise efficiency, and speed of training predictive machine learning models.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate revised predictions corresponding to the predictive data analysis requests, provide the revised predictions to the client computing entities 102, and automatically perform prediction-based actions based at least in part on the revised predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

A. Exemplary Predictive Data Analysis Computing Entity

FIG. 2 provides a schematic of a predictive data analysis computing entity 106 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

B. Exemplary Client Computing Entity

FIG. 3 provides an illustrative schematic representative of a client computing entity 102 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

As described below, various embodiments of the present disclosure make important technical contributions to improving predictive accuracy, computational efficiency, and speed of machine learning language models by assessing the influence of blocks of text on the probability of a document being assigned a given classification label, which in turn improves training speed and training efficiency of training predictive machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency-Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training predictive machine learning models.

FIG. 4 is a flowchart diagram of an example process 400 for performing predictive analysis with respect to a text-based machine learning model (e.g., document classification machine learning model). Via the various steps/operations of the process 400, the predictive data analysis computing entity 106, utilizing a machine learning framework, can perform one or more prediction inference operations with respect to classification output of a document classification machine learning model, and generate predictive data output that includes text predicted to be most influential on the probability of a document being assigned a given classification label (e.g., explaining/interpreting predictions made by a document classification machine learning model).

The process 400 begins at step/operation 401 when the predictive data analysis computing entity 106 receives one or more classification labels associated with one or more document data objects and originating from a document classification machine learning model. In some embodiments, the one or more classification labels may be received from a client computing entity. In some embodiments the one or more document classification labels may be received from the predictive data analysis computing entity 106. Examples of classification labels, using the healthcare space for example, may include medical codes (e.g., ICD codes, CPT codes, RX codes, and/or the like). A document data object may comprise a collection of one or more words. In various embodiments, a document data object may describe a document comprising text data, where the length (e.g., in terms of text) of the document may vary from one document to another. For example, a given document data object may comprise a long document (e.g., having over 30,000 words). As another example, a given document data object may comprise a document having less than 5000 words. In the healthcare space, for example, a document data object may include medical notes, clinical notes, medical charts, discharge summaries, and/or the like, where a medical chart, for example, my comprise text data of over 30,000 words.

In various embodiments, a document data object may comprise an unlabeled document data object, where an objective of a machine learning model, such as a document classification machine learning model, may be to assign one or more classification labels to the unlabeled document data object. For example, in the healthcare space, a document classification machine learning model may be configured to assign one or more International Statistical Classification of Diseases (ICD) codes, Current Procedural Terminology (CPT) codes, prescription (RX) codes, and/or the like to one or more of clinical notes, medical, charts, or discharge summaries, where the clinical notes, medical charts, or discharge summaries may comprise long documents. In some embodiments, the predictive data analysis computing entity 106 may receive the one or more document data objects from a client computing entity. In some embodiments, the predictive data analysis computing entity 106 may receive the one or more document data objects from the predictive data analysis computing entity 106.

In various embodiments, a document classification machine learning model may be any trained machine learning model configured to perform classification prediction tasks. For example, a document classification machine learning model according to various embodiments, may be applied to a classification task that includes a classification label space, where the document classification machine learning model may be configured to assign one or more classification labels from the classification label space to a document data object based at least in part on the content (e.g., text data) of the document data object. For example, in some embodiments, the document classification machine learning model may be a multi-label classification machine learning model configured to classify the one or more document data objects using the one or more classification labels, where, for example, the one or more classification labels may comprise a plurality of classification labels from a classification group associated with the one or more document data objects.

In some embodiments, the document classification machine learning model may be a language machine learning model and/or a long document classification machine learning model that is trained to classify document data objects using the one or more classification labels. For example, in some embodiments, the predictive data analysis computing entity 106 may be configured to fine-tune a language machine learning model (e.g., BERT, Big Bird, Longformer, and/or the like), where fine-tuning the language machine learning model may comprise training the language machine learning model to classify the one or more document data objects using the one or more classification labels (e.g., to classify the one or more document data object according to the one or more classification labels). In some embodiments, to fine-tune the language classification machine learning model, the predictive data analysis computing entity 106 may train the language classification machine learning model on a plurality of training document data objects (e.g., plurality labeled document data objects) using the one or more classification labels. It should be understood, however, that the document classification machine learning model is not limited to fine-tuned language machine learning models. As indicated above, the document classification machine learning model can be any machine learning model for classifying text (e.g., convolutional neural network for classifying text, and/or other machine learning classifiers for text).

At step/operation 402, the predictive data analysis computing entity 106 generates an unmasked label probability score for each of the one or more classification labels associated with the one or more document data objects. An unmasked label probability score for a given classification label may describe a label probability score that is generated for a document data object using an unmasked document data object version of the document data object, where the label probability score may comprise a likelihood of the given classification label being descriptive or representative of the document data object (e.g., the likelihood of the given classification label corresponding to the contents of the document data object).

In various embodiments, to generate the one or more unmasked label probability scores for a given document data object, the predictive data analysis computing entity 106, may receive a classification of the document data object (e.g., unmasked document data object version) via the document classification machine learning model. In various embodiments, the classification may comprise performing one or more predictive inference operations with respect to the document data object using the one or more classification labels, and generating a classification output for the document data object based at least in part on the content (e.g., text) of the document data object. In various embodiments, the predictive data analysis computing entity 106 may generate, for each of the one or more document data objects, one or more unmasked label probability scores. For each document data object, each unmasked label probability score of the one or more unmasked label probability scores generated for the document data object corresponds to a particular classification label of the one or more classification labels.

In an example embodiment, the predictive data analysis computing entity 106 may perform a classification for the document data object using a single classification label and generate an unmasked classification label probability score corresponding to the classification label. In another example embodiment, the predictive data analysis computing entity 106, using the document classification machine learning model, may perform a classification using a plurality of classification labels and generate a plurality of unmasked classification label probability scores, each corresponding to a particular classification label of the plurality of classification labels.

At step/operation 403, for each of the one or more document data objects, the predictive data analysis computing entity 106 segments (e.g., divides) the document data object into a plurality of text blocks having a text block size. For each document data object, each text block of the respective plurality of text blocks may comprise a sequence of words and/or subwords occurring within the document data object represented as a sequence of tokens (e.g., word tokens and/or subword tokens). In some embodiments, the plurality of text blocks may be associated with an order (e.g., sequential order) where each text block may be associated with an order number based at least in part on the order in which the text block occurs within the document data object. For example, continuing with the healthcare space illustration, for a given clinical note, the predictive data analysis computing entity 106 may segment text data within the clinical note into a plurality of text blocks, each comprising a sequence of words (and/or subwords) within the clinical note represented as a sequence of tokens.

In some embodiments, the document data object may be configured to segment a given document data object into a plurality of text blocks of text block size K. In some embodiments, based at least in part on the text block size, the predictive data analysis computing entity 106 may segment a given document data object into T text blocks, where at least T−1 text blocks have a fixed text block size (e.g., text block size K). A text block size may be based at least in part on one or more text block size measures (e.g., character count, word count, sentence count, paragraph count, and/or other text block size measures).

In some embodiments, segmenting a given document data object into a plurality of text blocks may comprise: (i) selecting a text block size measure and (ii) segmenting (e.g., dividing) the document data object into a plurality of text blocks of text block size K (e.g., 10 words, 5 sentences, 2 paragraphs, 150 characters, and/or the like) based at least in part on the selected text block size measure. For example, consider where the document data object is a clinical note and where the selected text block size measure is 20 words (e.g., K=20 words), the predictive data analysis computing entity 106 (e.g., starting from the beginning of the clinical note as an example) may segment the document data object into sequential text blocks, each comprising 20 sequential words represented as a sequence of tokens. As another example, consider where the document data object is a long medical chart and where the selected text block size measure is 2 sentences (e.g., K=2 sentences), the predictive data analysis computing entity 106 may segment the medical chart (e.g., starting from the beginning of the medical chart as an example) into a plurality of sequential text blocks, each comprising 2 sequential sentences represented as a sequence of tokens.

In some embodiments, the predictive data analysis computing entity 106 may be configured to segment a document data object into a plurality of text blocks having various text block sizes. In some embodiments, the predictive data analysis computing entity 106 may be configured to segment a document data object into a plurality of text blocks that do not overlap. In some embodiments, the predictive data analysis computing entity 106 may be configured to segment a document data object into a plurality of overlapping text blocks. In some embodiments, the predictive data analysis computing entity 106 may be configured to segment some document data objects into a plurality of overlapping text blocks and segment some document data objects into a plurality of non-overlapping text blocks. While various examples have been provided describing various techniques for segmenting a given document data object into text blocks, it should be understood that the text blocks may be segmented using other techniques and may comprise other text block size configurations.

At step/operation 404, for each of the one or more document data objects, the predictive data analysis computing entity 106 generates one or more per-iteration masked label probability scores for the document data object based at least in part on performing a classification of the document data object via one or more classification routine iterations. In various embodiments, the one more classification routine iterations comprise a required number of classification routine iterations (describe further below). For example, as further described below, in various embodiments, performing a classification of the document data object via one or more classification routine iterations comprise performing N classification routine iterations, where N may be determined based at least in part on dividing the expected text block masking count J by the text block masking probability P (e.g., J/P). A per-iteration masked label probability score may describe a label probability score generated for a document data object with one or more text blocks of the document data object masked (e.g., omitted, filtered, or removed).

In various embodiments, each classification routine iteration may comprise performing one or more predictive inference operations with respect to a masked version of the document data object (e.g. masked document data object) using the one or more classification labels, and generating a per-iteration masked label probability score based at least in part on the content (e.g., text) of the document data object. In various embodiments, the predictive data analysis computing entity 106 may generate, for each of the one or more document data objects, one or more per-iteration masked label probability scores. Moreover, for each document data object, each per-iteration masked label probability score of the one or more per-label masked label probability scores generated for the document data object corresponds to a particular classification label of the one or more classification labels.

In an example embodiment, the predictive data analysis computing entity 106 may perform the one or more classification routine iterations on a single classification label and generate a per-masked masked classification label probability score corresponding to the classification label. In another example embodiment, the predictive data analysis computing entity 106 may perform the one or more classification iterations on a plurality of classification labels and generate a plurality of per-iteration masked classification label probability scores, each corresponding to a particular classification label of the plurality of classification labels.

In some embodiments, each classification routine iteration is configured to: (i) mask one or more of the plurality of text blocks of the document data object, such that each text block of the masked one or more text blocks is absent from the document data object, (ii) generate, using the document classification machine learning model, a per-masked document classification of the document data object based at least in part on the masking of the one or more of the plurality of text blocks, and (iii) generate one or more per-iteration masked label probability scores based at least in part on the masked one or more of the plurality of text blocks absent from the document data object, where: (a) each of the one or more per-iteration masked label probability scores corresponds to a particular classification label of the one or more classification labels and is associated with each text block of the masked one or more of the plurality of text blocks.

A per-masked document classification may describe a classification output of a document data object that is generated based at least in part on performing a classification using a masked document data object corresponding to the document data object (e.g., a copy/version of the document data object having one or more masked/omitted text blocks). In various embodiments, masking the one or more text blocks may comprise omitting, filtering, and/or removing the one or more text blocks from the document data object. In some embodiments, masking the one or more text blocks may comprise a selective process, where each of the one or more text blocks that is masked is selectively selected. For example, in some embodiments, masking the one or more of the plurality of text blocks comprise selecting one or more text blocks of the plurality of text blocks of the document data object and masking the one or more selected text blocks. In one embodiment, selecting the one or more text blocks may be performed in random or semi-random fashion.

As noted above, in some embodiments, the one or more classification routine iterations comprise a required number of classification routine iterations. In some embodiments, the required number of classification routine iterations may be determined based at least in part on expected text block masking count J and text block masking probability P. For example, in some embodiments, the required number of classification routine iterations may be determined based at least in part by dividing the expected text block masking count J by the text block masking probability P (e.g., J/P). Text block masking probability P may describe the probability (e.g., likelihood) that a given text block will be masked (e.g., randomly or according to a defined probability) in a given classification routine iteration. The masking probability may be based at least in part on each text block size and/or number of text blocks. Expected text block masking count J may describe a desired (and/or required) minimum number of classification routine iterations in which a given text block should be masked (e.g., to achieve optimal results).

In some embodiments, for each document data object, the predictive data analysis computing entity 106 may perform a required number of classification routine iterations based at least in part on the expected text block masking count J and text block masking probability P, as described above, such that each text block is masked at least J times. In an example embodiment, J may be selected to be a value of 1000, where the predictive data analysis computing entity 106 may be configured to perform a required number of classification routine iterations where each text block of the plurality of text blocks of the respective document data object is masked at least 1000 times. In the noted example embodiment, given a masking probability of 0.1, the predictive data analysis computing entity 106 may perform 10,000 (e.g., 1000/0.1) classification routine iterations. Accordingly, the number of classification routine iterations may be configurable, where, for example, selecting a lower masking probability may require more classification routine iterations relative to selecting a higher masking probability (and vice versa). In some examples, a masking probability of 0.1 may be selected. In some embodiments, the predictive data analysis computing entity 106 may use one or more optimization techniques to determine optimal masking probability. In some embodiments, the optimal masking probability may be based at least in part on the text block size and/or the document data object type.

In some embodiments, the step/operation 404 may be performed in accordance with the process that is depicted in FIG. 5, which is a process for performing a classification routine iteration for a given document data object. The process that is depicted is FIG. 5, begins at step/operation 501, when the predictive data analysis computing entity 106 selectively masks one or more of the plurality of text blocks of the document data object (e.g., generated at step operation 403).

At step/operation 502, the predictive data analysis computing entity 106 generates one or more per-iteration masked label probability scores based at least in part on the masked one or more of the plurality of text blocks (absent from the document data object), where each per-iteration masked label probability score of the one or more per-iteration masked label probability scores corresponds to a particular classification label of the one or more classification labels and is associated with each text block of the masked one or more text blocks. In various embodiments, the predictive data analysis computing entity 106 may generate, using the document classification machine learning model, per-masked classification of the document data object based at least in part on masking of the one or more text blocks of the plurality of text blocks of the document data object and generate corresponding one or more per-iteration masked label probability scores. In various embodiments, generating per-masked classification of the document data object may comprise performing one or more prediction inference operations on a masked document data object that is generated based at least in part on selectively (e.g., in a random fashion) masking one or more text blocks of the document data object. In an example embodiment, masking one or more text blocks may comprise generating a masked version of the document data object based at least in part on omitting one or more text blocks from the document data object (corresponding to the one or more masked text blocks).

In various embodiments, each per-masked classification of the document data object is performed with respect to the one or more classification labels to generate a classification prediction for each of the one or more classification labels. For example, each classification routine iteration of the required number of classification routine iterations may be performed with respect to a classification label, to generate a classification prediction for the classification label. As another example, each classification routine iteration of the required number of classification routine iterations may be performed with respect to a plurality of classification labels, to generate a classification prediction for the each of the classification labels.

Returning to step/operation 405, for each document data object, the predictive data analysis computing entity 106 generates for each text block of the masked one or more of the plurality of text blocks, one or more per-label text block importance scores based at least in part on the one or more unmasked label probability scores for the document data object (e.g., generated at step/operation 402) and each per-iteration masked label probability score associated with the text block. In some embodiments, the step/operation 405 may be performed in accordance with the process that is depicted in FIG. 6, which is an example process for generating a per-label text block importance score for a particular text block. The process that is depicted in FIG. 6 may begin at step/operation 601 when the predictive data analysis computing entity 106 identifies, for a selected classification label of the one or more classification labels, each per-iteration masked label probability score associated with the particular text block. It should be understood that the process depicted in FIG. 6 may be performed for multiple classification labels. A selected classification label may comprise a classification label of the one or more classification labels that is selected to generate a per-label text block importance score based at least in part on the classification label. In some embodiments, identifying each per-iteration masked label probability score associated with the particular text block may comprise: (i) identifying each classification routine iteration performed using a masked document data object in which the text block is masked (e.g., in which the text block is absent) and (ii) for each identified classification routine iteration, identifying the per-iteration masked label probability score for the selected classification label from the one more per-iteration masked label probability scores generated (e.g., at step/operation 502) based at least in part on the identified classification routine iteration.

At step/operation 602, the predictive data analysis computing entity 106 generates a per-label masked label probability score associated with the text block with respect to the selected classification label based at least in part on each identified per-iteration masked label probability score. In some embodiments, the per-label masked label probability score associated with the text block comprise an average of the identified per-iteration masked label probability scores. For example, in some embodiments, to generate the noted per-label masked label probability score, the predictive data analysis computing entity 106 determines (e.g., computes) an average of the identified per-iteration masked label probability scores. In some embodiments, the per-label masked label probability score may be generated based at least in part on determining one or more other central tendency measures (e.g., median, mode, and/or the like) using the identified per-iteration masked label probability scores.

At step/operation 603, the predictive data analysis computing entity 106 generates the per-label text block importance score based at least in part on comparing the per-label masked label probability score $P_1$ with the unmasked label probability score $P_2$ for the selected classification label (e.g., corresponding unmasked label probability score generated at step/operation 402). The predictive data analysis computing entity 106 may compare the per-label masked label probability score $P_2$ with the unmasked label probability score $P_2$ using one or more of a variety of techniques.

In some example embodiments, comparing the per-label masked label probability score $P_1$ with the unmasked label probability score $P_2$ may comprise generating a per-label probability score difference measure $P_D$ based at least on computing the difference between the per-label masked label probability score $P_1$ and the unmasked label probability score. In the noted example embodiment, the per-label probability score difference measure $P_D$ may be indicative of the contribution (e.g., influence) of the text block to the unmasked label probability score $P_2$, and thus indicative of the contribution of the text block to classification of the document data object with respect to the selected classification label. A lower per-label probability score difference measure $P_D$ may be indicative of a higher contribution (and vice versa).

In some example embodiments, comparing the per-label masked label probability score $P_1$ with the unmasked label probability score $P_2$ may comprise generating a per-label probability score ratio measure $P_R$ based at least on the per-label masked label probability score $P_1$ and the unmasked label probability score $P_2$. For example, the predictive data analysis computing entity 106 may generate the per-label probability score ratio measure $P_R$ based at least in part on determining (e.g., computing) the ratio of the per-label masked label probability score $P_1$ relative to the unmasked label probability score $P_2$. In the noted example embodiment, the per-label probability score ratio measure $P_R$ may be indicative of the contribution (e.g., influence) of the text block to the unmasked label probability score $P_2$, and thus contribution of the text block to classification of the document data object with respect to the selected classification label.

In some embodiments, for a given document data object, the predictive data analysis computing entity 106 may generate a non-label-specific text block importance score based at least in part on each per-label text block importance score for the document data object. In some embodiments, to generate the non-label-specific text block importance score the predictive data analysis computing entity 106 may determine (e.g., compute) an average of the per-label text block importance scores using each per-label text block importance score for the document data object. In some embodiment, the predictive data analysis computing entity 106 may generate the non-label-specific text block score based at least in part on computing other central tendency measures (e.g., median, mode, and/or the like) using each per-label text block importance score for the document data object.

At step/operation 406, for each document data object, the predictive data analysis computing entity 106 generates a predictive data output based at least in part on the one or more text block importance scores. In some embodiments, the predictive data output for a given document data object may comprise one or more text blocks of the plurality of text blocks of the document data object determined as being most influential in classifying the document data object with respect to a given classification label based at least in part on the per-label text block importance score for each of the one or more selected text blocks. In some embodiments, the predictive data output for a given document data object may comprise one or more text blocks of the plurality of text blocks of the document data object determined as being most influential in classifying the document data object with respect to a plurality of classification labels based at least in part on the non-label-specific text block importance score for each of the one or more selected text blocks. In some embodiments, the predictive data output for a given document data object may comprise one or more text blocks of the plurality of text blocks of the document data object determined as being most influential in classifying the document data object with respect to a given classification label and a plurality of classification labels based at least in part on the per-label text block importance score and the non-label-specific text block importance score for each of the one or more selected text blocks. Accordingly, the predictive data output may be used to explain/interpret predictions made by the document classification machine learning model and may be used to determine and/or indicative of the prediction accuracy of the document classification machine learning model.

In some embodiments, to generate the predictive data output the predictive data analysis computing entity 106 may compare the one or more per-label text block importance scores and/or compare the one or more non-labelspecific text block importance scores. In some embodiments, comparing the one or more per-label text block importance scores and/or comparing the one or more non-label-specific text block importance scores may comprise ranking the selected text blocks based at least in part on the per-label text block importance score and/or the non-label-specific text block importance score for each text block, where the predictive data output may comprise the top-ranked R (e.g., 1 3, 5, or the like) text blocks having the highest per-label text block importance scores and/or the highest non-label-specific text block importance scores. For example, the top R text blocks having the highest per-label text block importance scores may be ranked in descending order. An another example, the top R text blocks having the highest non-label specific text block importance scores may be ranked in descending order. In some embodiments, comparing the one or more per-label text block importance scores and/or comparing the non-label-specific text block importance scores may comprise generating one or more z-scores.

In some embodiments, comparing the one or more per-label text block importance scores may comprise comparing each per-label text block importance score to an average per-label text block importance score, and selecting one or more text blocks having a per-label text block importance score that satisfies a defined threshold to comprise the predictive data output. In some embodiments, comparing the one or more non-label-specific text block importance scores may comprise comparing each non-label-specific text block importance score to an average non-label-specific text block importance score, and selecting one or more text blocks having a non-label-specific text block importance score that satisfies a defined threshold to comprise the predictive data output.

It should be understood that the predictive data analysis computing entity 106, according to the various embodiments described herein may generate a plurality of per-label text block importance scores for a given document data object, each corresponding to a particular classification label of the one or more classification labels.

FIG. 7 depicts an operational example of predictive data output generated according to one or more embodiments of the present disclosure. As shown in FIG. 7, the predictive data output comprises classification labels (e.g. diagnosis labels) 702, corresponding text block 704 having the highest per-label text block importance score with respect to the particular classification label (e.g., diagnosis label), the corresponding per-label probability score difference measure 706 and a p-value 708 that the given text block would have been identified as important relative to the null hypothesis by which text blocks initially labeled as more important than average are actually no more important than average for predicting the given classification label (described further below).

The p-value may be indicative of the relative importance of text blocks within a document data object and may be determined by comparing generated text block importance scores (e.g., non-label-specific text block important importance scores and/or per-label text block importance scores) to randomly sampled text block importance scores. For example, the p-value may be determined by sampling a defined number of text block importance scores for one or more other text blocks and generating a sample mean based at least in part on the text block importance scores, where the defined number of text block importance scores sampled may be based at least in part the number of times the text block was masked (e.g., at step/operation 404). A plurality of bootstrap iterations may then be performed and a sample mean generated for each bootstrap iteration. The p-value is then generated by dividing the number of times a sample mean generated for a bootstrap iteration is greater than the text block importance score for the text block by the number of bootstrap iterations performed. A bootstrap iteration may refer technique of "sampling with replacement" where text blocks may be reused in sampling/measuring iterations rather than sampling with text blocks and discarding the text block from further sampling/measuring.

Returning to FIG. 4, at step/operation 407, the predictive data analysis computing entity 106 performs one or more prediction-based actions based at least in part on the predictive data output. Examples of prediction-based actions include generating and/or displaying a user interface that displays the predictive data output (e.g., as depicted in FIG. 7). Another example prediction-based actions include transmitting the generated predictive data output to a client computing entity and/or causing rendering of a user interface displaying the predictive data output on a client computing entity. Yet another example of prediction-based actions include determining the predictive accuracy of a document classification machine learning model and generating an alert in response to a determined low predictive accuracy.

Additionally, in some embodiments, the predictive data analysis computing entity 106 may be configured to determine the relative importance of a group of text blocks (e.g., determine which text blocks occurring as distant parts within a document data object combine to influence the classification label probability for the document data object).

For example, in some embodiments, the predictive data analysis computing entity 106 may generate one or more per-label pairwise text block importance scores for the one or more document data objects. A per-label pairwise text block importance score may describe the relative importance for a given pair of text blocks of the plurality of text blocks of a document data object with respect to a particular selected classification label. The per-label pairwise text block importance score may be indicative of which text blocks occurring as distant parts within the document data object combine to influence the classification label probability for the document data object. It should be understood, however, that in some embodiment, the predictive data analysis computing entity 106 may be configured to generate the relative importance for more than two text blocks.

FIG. 8 depicts an example process 800 for generating a per-label pairwise text block importance score for a given document data object. The example process 800 begins at step/operation 801 when the predictive data analysis computing entity 106, identifies for each text block of a pair of text blocks, each per-iteration masked label probability score associated with each of the pair of text blocks. In some embodiments, the pair of text blocks may be selectively (e.g., randomly) selected. In some embodiments, the pair of text blocks may be selected from defined (e.g., strategic) locations within the document data object. In some embodiments, identifying each per-iteration masked label probability score associated with each pair of text blocks may comprise identifying each classification routine iteration in which each of the pair of text blocks is masked. For example, in some embodiments, identifying each per-iteration masked label probability score associated with the pair of text blocks may comprise: (i) identifying each classification routine iteration performed using a masked document data object in which each of the text blocks of the pair of text blocks is masked (e.g., in which each text block is absent) and (ii) for each identified classification routine iteration, identifying the per-iteration masked label probability score for the selected classification label from the one more per-iteration masked label probability scores generated based at least in part on the identified classification routine iteration. (e.g., generated at step/operation 502).

At step/operation 802, the predictive data analysis computing entity 106, generates, a per-label pairwise masked label probability score associated with the pair of text blocks with respect to the selected classification label based at least in part on each identified per-iteration masked label probability score associated with both text blocks. In some embodiments, the per-label pairwise masked label probability score comprise the average of the identified per-iteration masked label probability scores. For example, in some embodiments, to generate the per-label pairwise masked label probability score, the predictive data analysis computing entity 106 determines (e.g., computes) an average of the identified per-iteration masked label probability scores. In some embodiments, the per-label pairwise masked label probability score may be generated based at least in part on determining one or more other central tendency measures (e.g., median, mode, and/or the like) based at least in part on each identified per-iteration masked label probability score.

At step/operation 803, the predictive data analysis computing entity 106, generates the per-label pairwise text block importance score for the pair of text blocks based at least in part on comparing the per-label pairwise masked label probability score with the corresponding unmasked label probability score for the selected classification label. The predictive data analysis computing entity 106 may be configured to compare the unmasked label probability score with the per-label pairwise masked label probability score using one or more of a variety of techniques.

In some example embodiments, comparing the per-label pairwise masked label probability score with the corresponding unmasked label probability score may comprise generating a per-label pairwise probability score difference measure based at least on computing the difference between the per-label pairwise masked label probability score and the unmasked label probability score, wherein the per-label pairwise probability score difference measure may be indicative of the significance (e.g., contribution) of the pair of text blocks to the unmasked label probability score.

In some example embodiments, comparing the per-label pairwise masked label probability score with the corresponding unmasked label probability score may comprise generating a per-label pairwise probability score ratio measure based at least on computing the ratio of the per-label pairwise masked label probability score to the unmasked label probability score, wherein the per-label pairwise probability score ratio measure may be indicative of the contribution (e.g., influence) of the pair of text blocks to the unmasked label probability score.

Additionally and/or alternatively, in some embodiments, for a given document data object, the predictive data analysis computing entity 106 may generate a non-label-specific pairwise text block importance score based at least in part on each per-label pairwise text block importance score for the document data object. In some embodiments, to generate the non-label-specific pairwise text block importance score the predictive data analysis computing entity 106 may compute an average of the per-label pairwise text block importance scores using each per-label pairwise text block importance score for the document data object. In some embodiment, the predictive data analysis computing entity 106 may generate the non-label-specific pairwise text block score based at least in part on computing other central tendency measures (e.g., median, mode, and/or the like) using each per-label pairwise text block importance score for the document data object.

Additionally and/or alternatively, in some embodiments for a given pair of text blocks, the predictive data analysis computing entity 106 may determine a distance between the pair of text blocks (e.g., text block distance). In some embodiments, the distance may be measured in number of characters, number of words, and/or other measures. For given a pair of text blocks comprising a first text block and a second text block, in some embodiments, the distance may be measured from the end of the first text block to the beginning of the second text block. In some embodiments, the distance may be measured from beginning of the first text block to beginning of the second text block, end first text block to end of the second text block, middle first text block to middle of the second text block, and/or the like.

Additionally and/or alternatively, in some embodiments for a given pair of text blocks, the predictive data analysis computing entity 106 may determine (e.g., measure) the association between a text block distance and importance measure (e.g., based at least in part on per-label text block importance score and/or non-label-specific text block importance scores) using one or more techniques (e.g., correlation coefficients and/or the like). In some embodiments a pair of text blocks with high per-label pairwise text block importance score and/or non-specific per-label pairwise text block importance scores may be associated with high text block distance between the pair of text blocks, which may be indicative the document classification machine learning model is effectively considering information from distant parts of a document data object in generating predictions.

Accordingly, as described above, various embodiments of the present disclosure make important technical contributions to improving predictive accuracy, computational efficiency, and speed of machine learning language models by assessing the influence of blocks of text on the probability of a document being assigned a given classification label, which in turn improves training speed and training efficiency of training predictive machine learning models. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures, see, e.g., Sun et al., *Feature-Frequency-Adaptive On-line Training for Fast and Accurate Natural Language Processing* in 40(3) Computational Linguistic 563 at Abst. ("Typically, we need to make a tradeoff between speed and accuracy. It is trivial to improve the training speed via sacrificing accuracy or to improve the accuracy via sacrificing speed. Nevertheless, it is nontrivial to improve the training speed and the accuracy at the same time"). Accordingly, techniques that improve predictive accuracy without harming training speed, such as the techniques described herein, enable improving training speed given a constant predictive accuracy. In doing so, the techniques described herein improve efficiency and speed of training predictive machine learning models, thus reducing the number of computational operations needed and/or the amount of training data entries needed to train predictive machine learning models. Accordingly, the techniques described herein improve at least one of the computational efficiency, storage-wise efficiency, and speed of training predictive machine learning models.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for processing document classification system outputs, the computer-implemented method comprising:
   generating, using one or more processors, an unmasked label probability score, of one or more unmasked label probability scores, for each of one or more classification labels based at least in part on one or more document data objects;
   for each document data object of the one or more document data objects:
   segmenting, using the one or more processors, the document data object into a plurality of text blocks;
   performing, using the one or more processors and a document classification machine learning model, a classification of the document data object via one or more classification routine iterations, wherein each of the one or more classification routine iterations is configured to:
   (i) generate one or more masked text blocks by masking one or more text blocks of the plurality of text blocks,
   (ii) generate, using the document classification machine learning model, per-masked document classification of the document data object, based at least in part on the masking of the one or more masked text blocks, and
   (iii) generate one or more per-iteration masked label probability scores based at least in part on the one or more masked text blocks absent from the document data object, wherein each of the one or more per-iteration masked label probability scores correspond to a particular classification label of the one or more classification labels and is associated with one or more of the one or more masked text blocks;
   for each masked text block of the one or more masked text blocks:
   generating, using the one or more processors, one or more per-label text block importance scores based at least in part on a corresponding one of the one or more unmasked label probability scores and each of the one or more per-iteration masked label probability scores associated with the masked text block;
   generating, using the one or more processors, a predictive data output for the document data object based at least in part on the one or more per-label text block importance scores; and
   performing, using the one or more processors, one or more prediction-based actions based at least in part on the predictive data output for the one or more document data objects.

2. The computer-implemented method of claim 1, wherein generating a per-label text block importance score of the one or more per-label text block importance scores for the masked text block comprises:
   identifying, for a selected classification label of the one or more classification labels, each of the one or more per-iteration masked label probability scores associated with the masked text block;
   generating, a per-label masked label probability score associated with the masked text block with respect to the selected classification label based at least in part on each of the one or more per-iteration masked label probability score associated with the masked text block; and
   generating the per-label text block importance score for the selected classification label based at least in part on comparing the unmasked label probability score for the selected classification label with the per-label masked label probability score.

3. The computer-implemented method of claim 1, wherein the one or more classification routine iterations comprise a required number of classification routine iterations that is determined based at least in part on an expected text block masking count and a text block masking probability.

4. The computer-implemented method of claim 1, wherein masking the one or more text blocks of the plurality of text blocks comprises randomly selecting the one or more text blocks of the plurality of text blocks and masking the one or more text blocks.

5. The computer-implemented method of claim 1, wherein each of the plurality of text blocks comprises a sequence of words represented as a sequence of tokens.

6. The computer-implemented method of claim 1, wherein segmenting the document data object into the plurality of text blocks comprises selecting a text block size measure and segmenting the document data object based at least in part on the text block size measure.

7. The computer-implemented method of claim 1, wherein the one or more document data objects comprise a long document.

8. The computer-implemented method of claim 1, wherein the document classification machine learning model is a multi-label classification machine learning model.

9. The computer-implemented method of claim 1, wherein the predictive data output comprises one or more selected ones of the one or more text blocks based at least in part on the one or more per-label text block importance scores for each of the one or more selected ones of the one or more text blocks.

10. A system for processing document classification system outputs, the system comprising one or more processors and at least one memory storing processor executable instructions that, when executed by the one or more processors, cause the one or more processors to perform operations comprising:
   generating an unmasked label probability score, of one or more unmasked label probability scores, for each of one or more classification labels based at least in part on one or more document data objects;
   for each document data object of the one or more document data objects:
   segmenting the document data object into a plurality of text blocks;
   performing, using a document classification machine learning model, a classification of the document data object via one or more classification routine iterations, wherein each of the one or more classification routine iterations is configured to:
   (i) generate one or more masked text blocks by masking one or more text blocks of the plurality of text blocks, (ii) generate, using the document classification machine learning model, per-masked document classification of the document data object, based at least in part on the one or more masked text blocks, and (iii) generate one or more per-iteration masked label probability scores based at least in part on the one or more masked text blocks absent from the document data object, wherein each of the one or more per-iteration masked label probability scores correspond to a particular classification label of the one or more classification labels and is associated with one or more of the one or more masked text blocks;

for each masked text block of the one or more masked text blocks:

generating one or more per-label text block importance scores based at least in part on a corresponding one of the one or more unmasked label probability scores and each of the one or more per-iteration masked label probability scores associated with the masked text block;

generating a predictive data output for the document data object based at least in part on the one or more per-label text block importance scores; and performing one or more prediction-based actions based at least in part on the predictive data output for the one or more document data objects.

11. The system of claim 10, wherein generating a per-label text block importance score of the one or more per-label text block importance scores for the masked text block comprises:

identifying, for a selected classification label of the one or more classification labels, each of the one or more per-iteration masked label probability scores associated with the masked text block;

generating, a per-label masked label probability score associated with the masked text block with respect to the selected classification label based at least in part on each of the one or more per-iteration masked label probability score associated with the masked text block; and generating the per-label text block importance score for the selected classification label based at least in part on comparing the unmasked label probability score for the selected classification label with the per-label masked label probability score.

12. The system of claim 10, wherein the one or more classification routine iterations comprise a required number of classification routine iterations that is determined based at least in part on an expected text block masking count and a text block masking probability.

13. The system of claim 10, wherein masking the one or more text blocks of the plurality of text blocks comprises randomly selecting the one or more text blocks of the plurality of text blocks and masking the one or more text blocks.

14. The system of claim 10, wherein each of the plurality of text blocks comprises a sequence of words represented as a sequence of tokens.

15. The system of claim 10, wherein segmenting the document data object into the plurality of text blocks comprises selecting a text block size measure and segmenting the document data object based at least in part on the text block size measure.

16. The system of claim 10, wherein the one or more document data objects comprise a long document.

17. The system of claim 10, wherein the document classification machine learning model is a multi-label classification machine learning model.

18. The system of claim 10, wherein the predictive data output comprises one or more selected ones of the one or more text blocks based at least in part on the one or more per-label text block importance scores for each of the one or more selected ones of the one or more text blocks.

19. One or more non-transitory computer-readable storage media for processing document classification system outputs, the one or more non-transitory computer-readable storage media storage instructions that, when executed by one or more processors, configure the one or more processors to perform operations comprising:

generating an unmasked label probability score, of one or more unmasked label probability scores, for each of one or more classification labels based at least in part on one or more document data objects;

for each document data object of the one or more document data objects:

segmenting the document data object into a plurality of text blocks;

performing, using a document classification machine learning model, a classification of the document data object via one or more classification routine iterations, wherein each of the one or more classification routine iterations is configured to:

(i) generate one or more masked text blocks by masking one or more text blocks of the plurality of text blocks, (ii) generate, using the document classification machine learning model, per-masked document classification of the document data object, based at least in part on the one or more masked text blocks, and (iii) generate one or more per-iteration masked label probability scores based at least in part on the one or more masked text blocks absent from the document data object, wherein each of the one or more per-iteration masked label probability scores correspond to a particular classification label of the one or more classification labels and is associated with one or more of the one or more masked text blocks;

for each masked text block of the one or more masked text blocks:

generating one or more per-label text block importance scores based at least in part on a corresponding one of the one or more unmasked label probability scores and each of the one or more per-iteration masked label probability scores associated with the masked text block;

generating a predictive data output for the document data object based at least in part on the one or more per-label text block importance scores; and performing one or more prediction-based actions based at least in part on the predictive data output for the one or more document data objects.

20. The one or more non-transitory computer-readable storage media of claim 19, wherein generating a per-label text block importance score of the one or more per-label text block importance scores for the masked text block comprise:

identifying, for a selected classification label of the one or more classification labels, each of the one or more per-iteration masked label probability scores associated with the masked text block;

generating, a per-label masked label probability score associated with the masked text block with respect to the selected classification label based at least in part on each of the one or more per-iteration masked label probability score associated with the masked text block; and generating the per-label text block importance score for the selected classification label based at least in part on comparing the unmasked label probability score for the selected classification label with the per-label masked label probability score.

* * * * *

UNITED STATES PATENT AND TRADEMARK OFFICE
CERTIFICATE OF CORRECTION

| | |
|---|---|
| PATENT NO. | : 12,272,168 B2 |
| APPLICATION NO. | : 18/046831 |
| DATED | : April 8, 2025 |
| INVENTOR(S) | : Joel Stremmel et al. |

Page 1 of 1

It is certified that error appears in the above-identified patent and that said Letters Patent is hereby corrected as shown below:

In the Claims

In Column 34, Line 12, Claim 19, delete "storage instructions" and insert -- storing instructions --, therefor.

Signed and Sealed this
Eighth Day of July, 2025

Coke Morgan Stewart
*Acting Director of the United States Patent and Trademark Office*